United States Patent
Nakano et al.

(10) Patent No.: US 8,755,012 B2
(45) Date of Patent: Jun. 17, 2014

(54) DISPLAY DEVICE

(71) Applicants: Japan Display East, Inc., Chiba-ken (JP); Panasonic Liquid Crystal Display Co., Ltd., Hyogo-ken (JP)

(72) Inventors: Yasushi Nakano, Tokyo (JP); Hitoshi Azuma, Yokohama (JP); Tomio Yaguchi, Sagamihara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 13/859,860

(22) Filed: Apr. 10, 2013

(65) Prior Publication Data

US 2013/0229601 A1 Sep. 5, 2013

Related U.S. Application Data

(63) Continuation of application No. 12/849,100, filed on Aug. 3, 2010, now abandoned.

(30) Foreign Application Priority Data

Aug. 4, 2009 (JP) ................. 2009-181247

(51) Int. Cl.
*G02F 1/1335* (2006.01)
*G02F 1/1333* (2006.01)
(52) U.S. Cl.
USPC ........................................... 349/122; 349/96
(58) Field of Classification Search
None
See application file for complete search history.

(56) References Cited

U.S. PATENT DOCUMENTS

| 5,706,065 | A | 1/1998 | Yano |
|---|---|---|---|
| 6,147,738 | A | 11/2000 | Okamoto |
| 6,417,904 | B1 | 7/2002 | Yamaoka et al. |
| 7,177,067 | B1 | 2/2007 | Sakamoto |
| 2007/0290609 | A1 | 12/2007 | Ishii et al. |
| 2008/0079874 | A1 | 4/2008 | Muneyoshi et al. |
| 2008/0225214 | A1* | 9/2008 | Kinoshita et al. ............. 349/122 |

(Continued)

FOREIGN PATENT DOCUMENTS

| JP | 2007-335365 | 12/2007 |
|---|---|---|
| JP | 2008-039866 | 2/2008 |
| JP | 2008-089994 | 4/2008 |
| WO | WO 2009084832 A2 * | 7/2009 |

OTHER PUBLICATIONS

Asano et al. (43.2: Low-Temperature Polycrystalline-Silicon TFT Color LCD Panel Made of Plastic Substrates, SID 02 Digest, 2002, pp. 1196-1199).*

*Primary Examiner* — Michelle R Connelly
(74) *Attorney, Agent, or Firm* — Antonelli, Terry, Stout & Kraus, LLP.

(57) ABSTRACT

A display device includes a plastic substrate and a thin film transistor layer including at least one thin film transistor. The thin film transistor layer is disposed on the plastic substrate via a resin film having no viscosity or adhesion and an adhesive film. The resin film has a first surface formed on a first surface of the thin film transistor layer, the first surface of the thin film transistor layer being at one side of the plastic substrate, and the adhesive film is formed on a second surface of the resin film, the second surface of the resin film being at the one side of the plastic substrate, and the resin film is attached to the plastic substrate by the adhesive film.

11 Claims, 7 Drawing Sheets

(56) References Cited

U.S. PATENT DOCUMENTS

| | | |
|---|---|---|
| 2009/0091693 A1* | 4/2009 | Izumi ............................ 349/96 |
| 2009/0103018 A1 | 4/2009 | Matsumori et al. |
| 2010/0003804 A1* | 1/2010 | Eguchi et al. ................. 438/459 |
| 2010/0327737 A1 | 12/2010 | Hayashi et al. |
| 2011/0051070 A1 | 3/2011 | Sasaki et al. |
| 2011/0255034 A1 | 10/2011 | Nakano et al. |

* cited by examiner

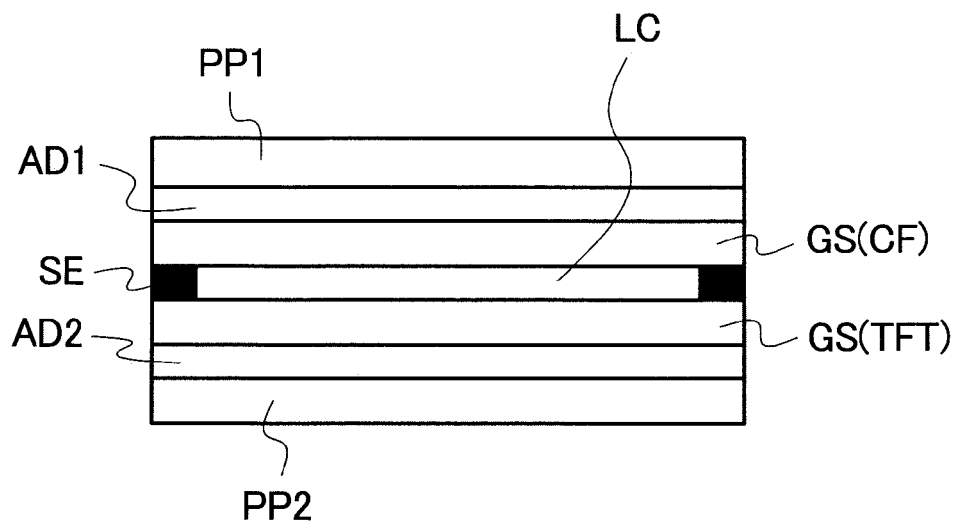
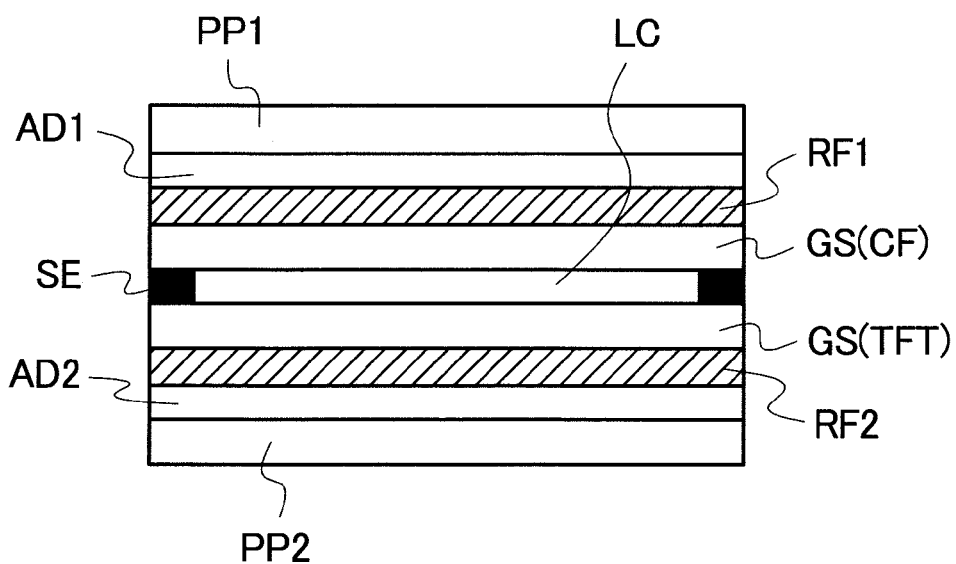

DISPLAY DEVICE

CROSS-REFERENCE TO RELATED APPLICATION

This application is a continuation of U.S. application Ser. No. 12/849,100, filed Aug. 3, 2010, the contents of which are incorporated herein by reference.

The present application claims priority from Japanese application JP 2009-181247 filed on Aug. 4, 2009, the content of which is hereby incorporated by reference into this application.

BACKGROUND OF THE INVENTION

1. Field of the Invention

The present invention relates to a display device, and in particular, to a display device of which the mechanical strength of a display panel, being vulnerable to impact, and using a thin glass substrate, on which a thin film transistor and a color film are formed, and a transferred thin film transistor layer, has been improved.

2. Description of the Related Art

Various display devices, such as a liquid crystal display device and an organic electroluminescence display device (organic EL display device), have been put into practical use. Also, portable telephones and portable information terminals, into each of which one of these display devices is built, have also been provided. In a display device of recent years, in order to promote a reduction in thickness, reduction in weight, and increase in flexibility of the display device, the practice is that a thin glass substrate in JP-A-2008-39866, or the like, and a plastic substrate in JP-A-2008-89994, or the like, are used as a substrate material forming the display device.

Also, as shown in JP-A-2008-89994 or the like, a display device is also proposed which deforms flexibly by, after forming a functional element, such as a thin film transistor (TFT), on a glass substrate, removing the glass or reducing it into a thin film, and reattaching the functional element to a plastic substrate.

A display device, such as a liquid crystal display device or an organic EL display device, is not only configured of one substrate but, for example, as shown in FIG. 1, with a display panel of the liquid crystal display device, as well as a glass substrate (GS (CF)) on which a color filter is formed being disposed opposed to a glass substrate (GS (TFT)) on which a thin film transistor (TFT) is formed, a seal member SE is disposed on the perimeter of the substrates, thus sealing a liquid crystal LC. Furthermore, a structure is such that polarizing plates PP1 and PP2 are attached to surfaces of the substrates with adhesives AD1 and AD2 respectively. Also, in the organic EL display device too, as in JP-A-2007-335365, a configuration is employed wherein polarizing plates are attached to a display panel.

In this way, in a display device, it is necessary that a plurality of plate-like bodies are layered one on another, causing a further increase in the thickness of a display panel configuring the display device. For this reason, it is necessary to still further reduce the thickness of a glass substrate and a plastic substrate, further weakening the mechanical strength of the display panel. In particular, a display device having this kind of display panel is weakened in impact strength, which has become a major problem in a case of using the display device in an instrument, such as a portable telephone or a portable information terminal, which is highly likely to suffer a variety of impacts.

SUMMARY OF THE INVENTION

The invention has been made to solve the above-described problem, and therefore an object of the invention is to provide a display device with an increased impact strength which improves the mechanical strength of a display panel configuring a display device.

To achieve the above object, according to the invention, there is provided the following display device.

1. A display device has a thin film transistor or a color filter formed on a glass substrate, and a polarizing plate attached to the glass substrate with an adhesive, wherein a resin film having no viscosity or adhesion is disposed on the polarizing plate side surface of the glass substrate.

2. In the display device according to the heretofore described aspect 1, the polarizing plate is attached to the resin film with an adhesive.

3. In the display device according to the heretofore described aspect 1, a plastic substrate is attached to the resin film with an adhesive, and furthermore, the polarizing plate is attached to the plastic substrate with an adhesive.

4. The display device according to the heretofore described aspect 1 includes a display panel in which a thin film transistor is formed on the glass substrate, a color filter is formed on a plastic substrate, and the glass substrate and plastic substrate are disposed opposed to each other, wherein another plastic substrate is attached to the resin film of the glass substrate with an adhesive, and furthermore, the polarizing plate is attached to the other plastic substrate with an adhesive.

5. In the display device according to any one of the heretofore described aspects 1 to 4, the resin film is formed in only an area close to the perimeter of the glass substrate.

6. In the display device according to the heretofore described aspect 1, the resin film is such that an ultraviolet curable or heat curable resin is applied as a coating, and thereafter, cured.

7. In the display device according to the heretofore described aspect 1, the retardation of the resin film is 5 nm or less.

8. In the display device according to the heretofore described aspect 1, the thickness of the resin film is 100 µm or less.

9. A display device has a thin film transistor layer, including a thin film transistor, provided on a glass substrate, the glass substrate being removed from the thin film transistor layer, and a polarizing plate being attached to the thin film transistor layer with an adhesive, wherein a resin film having no viscosity or adhesion is disposed on the polarizing plate side surface of the thin film transistor layer, a plastic substrate is attached to the resin film with an adhesive, and furthermore, the polarizing plate is attached to the plastic substrate with an adhesive.

10. In the display device according to any one of the heretofore described aspects 1 to 8, the thickness of the glass substrate is 0.15 mm or less.

11. In the display device according to any one of the heretofore described aspects 1 to 8, the thickness of the glass substrate is 0.05 mm or less.

12. The display device according to any one of the heretofore described aspects 1 to 11 is a liquid crystal display device.

13. The display device according to any one of the heretofore described aspects 1 to 3 or 6 to 8 is an organic EL display device.

According to the invention, by the resin film, having no viscosity or adhesion, being disposed on the polarizing plate side surface of the glass substrate, or on the polarizing plate side surface of the transferred thin film transistor layer, it is possible to improve the mechanical strength of the display panel, and, in particular, provide the display device with an increased impact strength.

BRIEF DESCRIPTION OF THE DRAWINGS

FIG. 1 is a sectional view illustrating a structure of a liquid crystal display panel used in a heretofore known display device;

FIG. 2 is a sectional view illustrating a structure of a liquid crystal display panel used in a display device of the invention;

DETAILED DESCRIPTION OF THE INVENTION

Figure 3A:
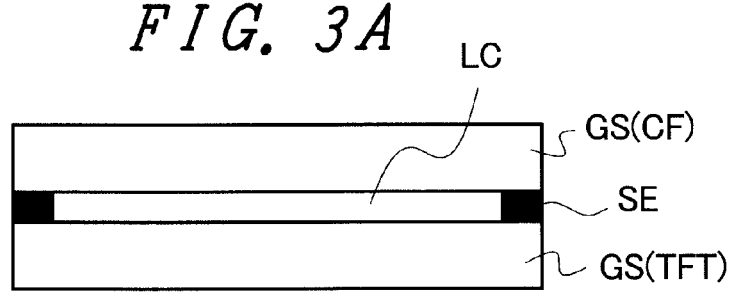
FIGS. 3A to 3D show a first embodiment illustrating a process of manufacturing a display panel used in the display device of the invention.

Hereafter, a detailed description will be given of a display device according to the invention. FIG. 2 is a diagram showing one example of the structure of a liquid crystal display panel used in the display device of the invention. The structure of the liquid crystal display panel is such that a glass substrate (GS (TFT)), on which a thin film transistor (TFT) is formed, and a glass substrate (GS (CF)), on which a color filter is formed, are disposed opposed to each other, a seal member SE is disposed on the perimeter of both substrates, and a liquid crystal LC is sealed inside. Naturally, an electrode for applying an electric field to the liquid crystal, an oriented film for controlling the molecular orientation of the liquid crystal, and the like, are provided on the glass substrate. A power supply line for supplying power to the electrode, a signal line for applying a signal to a transistor which drives the electrode, and the like, are provided on the glass substrate on which the thin film transistor is formed.

A feature of the display device of the invention is that a resin film (RF2 or RF1) having no viscosity or adhesion is disposed on at least one glass substrate (GS (TFT) or GS (CF)). By disposing this kind of resin film on a surface of the substrate, it is possible to dramatically increase the mechanical strength of the substrate. In particular, when the thickness of the glass substrate is 0.15 mm or less, more preferably, 0.05 mm or less, the increase in mechanical strength of the display panel due to the existence of the resin film becomes more conspicuous.

As a method of forming the resin film, having no viscosity or adhesion, on the glass substrate, it is possible to easily form the resin film by coating the surface of the glass substrate with an ultraviolet curable or heat curable resin, and subsequently, carrying out an ultraviolet irradiation or an application of heat, thus curing the resin applied as a coating.

The resin film formed in this way covers the surface of the glass substrate, and is integrated with the glass substrate, but the surface of the resin film has no viscosity or adhesion. Also, as the thickness of the resin film is normally extremely small, on the order of several micrometers to several tens of micrometers, it will hardly cause an increase in thickness of the display panel but, as it is possible to adjust the thickness of the resin film by applying a thicker or additional coating of the resin, or the like, it is preferable to set the thickness of the resin film to 100 μm or less from the viewpoint of limiting the thickness of the display panel.

As a characteristic of the resin film is such that the resin film is disposed in the vicinity of pixels configuring the display panel, on the surface of the glass substrate, it is preferable that the retardation of the resin film is 5 nm or less. Because of this, it is possible to suppress any adverse effect such as image distortion.

An impact test and a bend test have been carried out in order to evaluate an effect of disposing the resin film. In a case in which the thickness of the glass substrate is made 0.1 mm, with an impact test using a stainless steel ball (a breaking test wherein a stainless steel ball is caused to fall naturally from a predetermined height toward the substrate), when the resin film exists, it is confirmed that no breakage occurs even from a height about eight times a threshold height at which the glass substrate does not break when there is no resin film. Also, with a bend test using the same substrate too (a test for measuring the curvature of a limit with which the substrate is bent and broken), when the resin film exists, it is confirmed that it is possible to bend the substrate up to a curvature 1.5 times that of when there is no resin film.

Furthermore, it is more preferable that the resin film (RF1 or RF2) shown in FIG. 2 is disposed over the entire surface of the glass substrate but, even when the resin film is disposed only in an area close to the perimeter of the glass substrate, a certain increase in mechanical strength can be expected. In particular, when a polarizing plate, another substrate (a plastic substrate), or the like, is attached to the surface of the resin film using an adhesive, as will be described hereafter, even by simply disposing the resin film in a peripheral area, it is possible to increase the mechanical strength of the glass substrate to a strength close to a case in which the resin film is disposed over the entire surface of the glass substrate.

With the display device of the invention, furthermore, as shown in FIG. 2, a polarizing plate (PP1 or PP2; the thickness of the polarizing plate is about 100 μm) is attached to the glass substrate (GS (CF) or GS (TFT)) by means of an adhesive (AD1 or AD2, the thickness of the adhesive is around 20 μm). Even though the display panel is configured by attaching a multilayer plate-like body in this way, as the resin film (RF1 or RF2) is thus disposed, it is possible to reduce the thickness of the glass substrate to 0.15 mm or less, and even to 0.05 mm or less, and it is possible to reduce the thickness of the whole of the display panel.

Hereafter, a description will be given of a manufacturing process of each kind of display panel used in the display device of the invention.

FIGS. 3A to 3D, being a first embodiment relating to a display panel manufacturing process, illustrate steps of fabricating the display panel shown in FIG. 2.

In Step 1 (FIG. 3A), a liquid crystal display cell (an LCD cell) using glass substrates is fabricated by a heretofore known method. At this time, the thickness of the glass substrates is 0.5 mm, and the layer thickness of a liquid crystal LC between the substrates is around 4 μm. Naturally, a color filter and the like are formed on the glass substrate (GS (CF)), and a thin film transistor and the like are formed on the glass substrate (GS (TFT)).

In Step 2 (FIG. 3B), the thickness of the glass substrates is reduced to 0.15 mm by a mechanical polishing and/or an HF etching. Naturally, it is also possible to reduce the thickness of the glass substrates to 0.05 mm.

Next, in Step 3 (FIG. 3C), the thickness-reduced glass substrates are coated with an ultraviolet curable resin by a spin coat method, a slit coat method, or the like, and furthermore, the resin applied as a coating is cured by being irradiated with ultraviolet (UV). Although the thickness of the resin film can be set arbitrarily, it is possible to set it to a range of 0.5 μm to 100 μm. It is also possible to employ a heat curable resin in place of the ultraviolet curable resin.

Finally, in Step 4 (FIG. 3D), a polarizing plate (PP1 or PP2) with an adhesive (AD1 or AD2) is attached to a surface of the resin film (RF1 or RF2).

FIGS. 4A to 4E, being a second embodiment relating to the display panel manufacturing process, illustrate steps of fabricating a liquid crystal display panel with a plastic substrate attached on either side of the liquid crystal display cell.

Figure 3B:
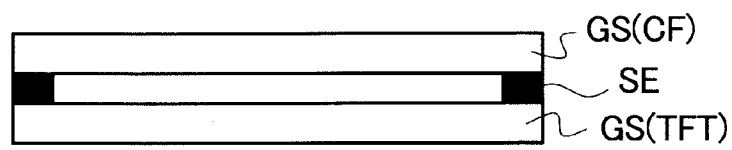
Figure 3C:
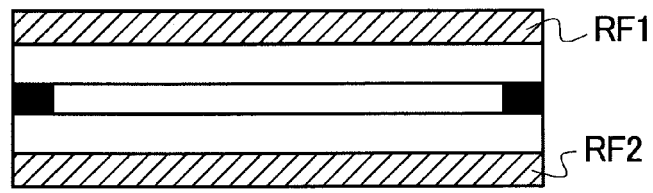
Figure 3D:
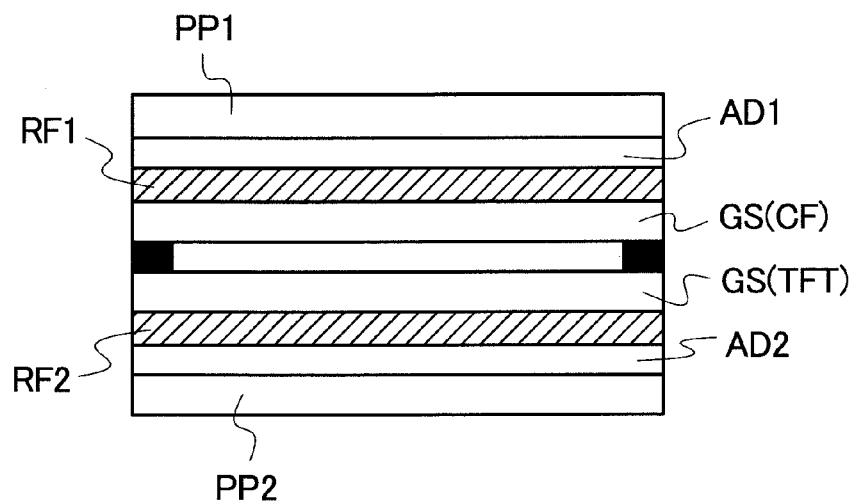
Figure 4A:
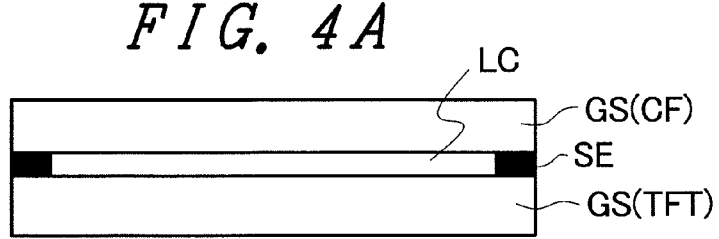
FIGS. 4A to 4E show a second embodiment illustrating a process of manufacturing a display panel used in the display device of the invention.
Figure 4B:
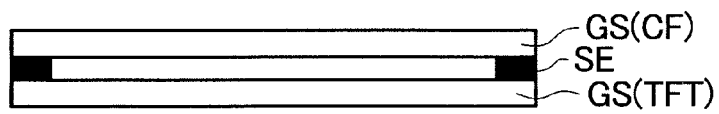
Figure 4C:
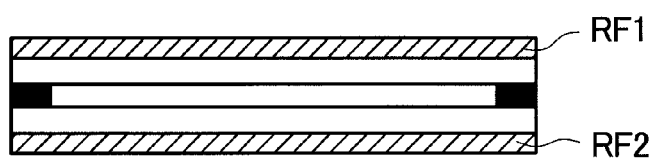
Figure 4D:
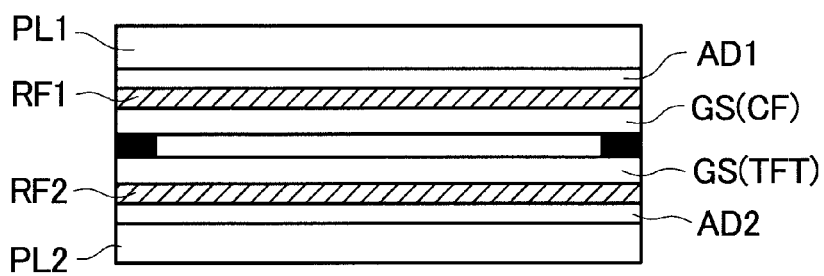
Figure 4E:
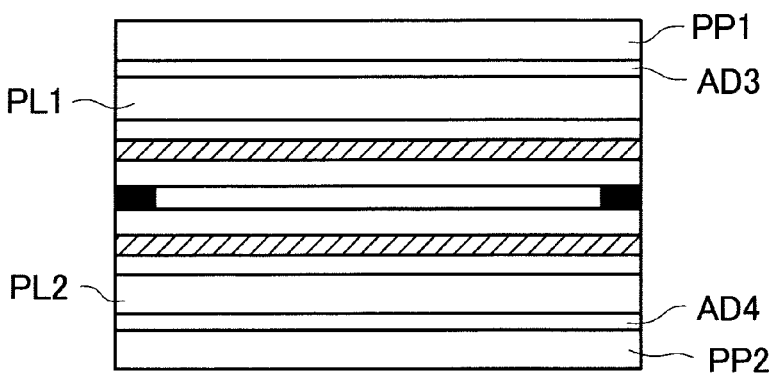
Figure 5A:
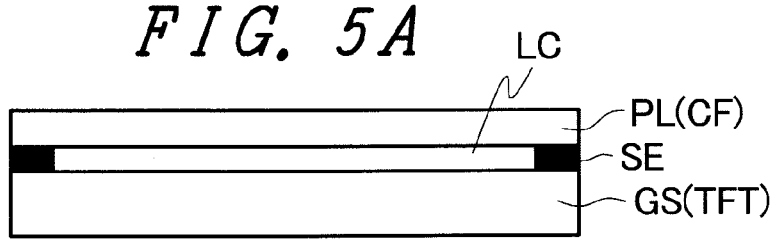
FIGS. 5A to 5E show a third embodiment illustrating a process of manufacturing a display panel used in the display device of the invention.
Figure 5B:
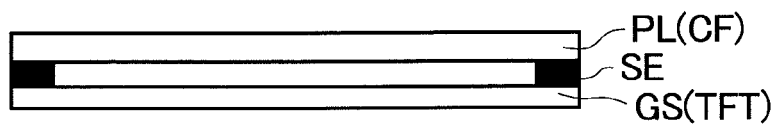
Figure 5C:
Figure 5D:
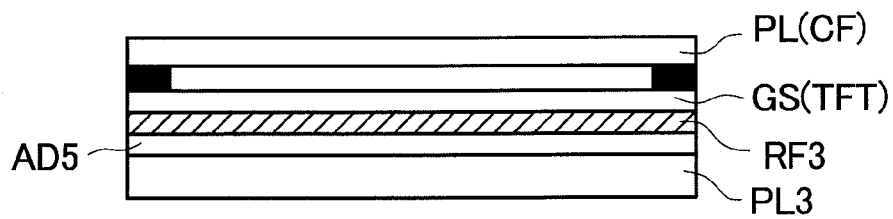
Figure 5E:
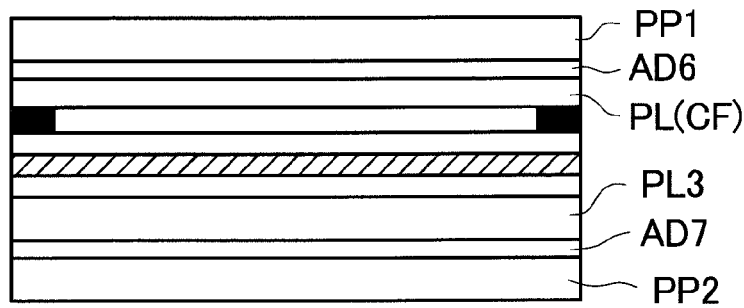
Figure 6A:
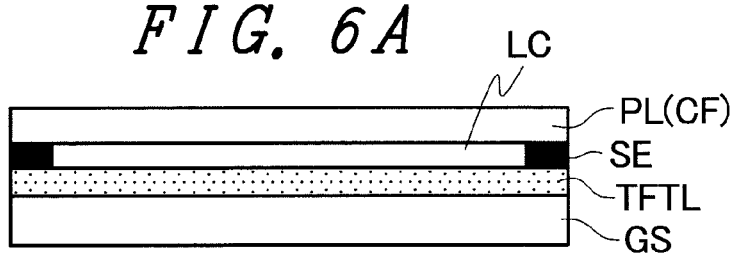
FIGS. 6A to 6E show a fourth embodiment illustrating a process of manufacturing a display panel used in the display device of the invention.
Figure 6B:
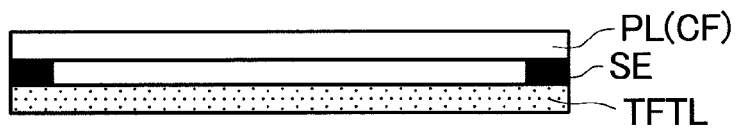
Figure 6C:
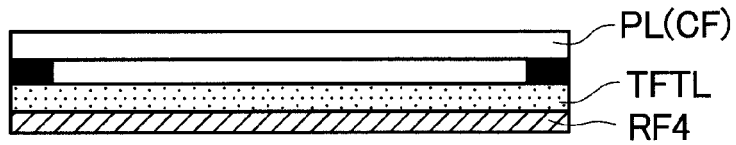
Figure 6D:
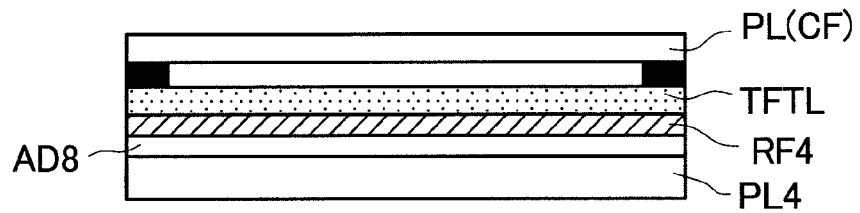
Figure 6E:
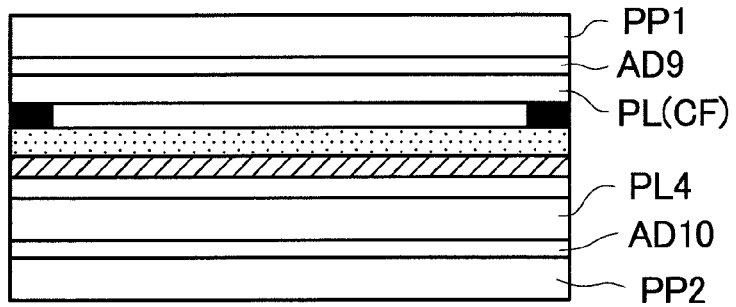

Steps 1 to 3 of FIG. 4A to 4C are the same as Steps 1 to 3 of FIG. 3A to 3C. In Step 4 (FIG. 4C), a surface of the resin film (RF1 or RF2) is coated with an adhesive (AD1 or AD2), and a plastic substrate (0.1 mm thick; PL1 or PL2) is attached thereto.

Finally, in Step 5 (FIG. 4E), a polarizing plate (PP1 or PP2) with an adhesive (AD3 or AD4) is attached to a surface of the plastic substrate (PL1 or PL2).

FIGS. 5A to 5E, being a third embodiment relating to a display panel manufacturing process, illustrate steps of fabricating a liquid crystal display panel in which a liquid crystal display cell is configured of substrates of different materials, a glass substrate and a plastic substrate, wherein another plastic substrate is attached on the glass substrate side.

In Step 1 (FIG. 5A), a color filter is formed on a 0.1 mm thick plastic substrate (PL (CF)), a thin film transistor (TFT) is formed on a 0.5 mm thick glass substrate (GS (TFT)) and, as well as both of them being attached to each other, a seal member SE is disposed between both substrates, and a liquid crystal LC is sealed inside, fabricating a liquid crystal display cell. The layer thickness of the liquid crystal LC between the substrate is around 4 μm.

In Step 2 (FIG. 5B), the thickness of the glass substrate on which the TFT is formed is reduced to 0.15 mm by a mechanical polishing and/or an HF etching. Naturally, it is also possible to reduce the thickness of the glass substrate to 0.05 mm.

In Step 3 (FIG. 5C), the thickness-reduced glass substrate (GS (TFT)) is coated with an ultraviolet curable resin by a spin coat method, a slit coat method, or the like, and furthermore, the resin film (RF3) applied as a coating is cured by being irradiated with ultraviolet (UV). Although the thickness of the resin film can be set arbitrarily, it is possible to set it to a range of 0.5 μm to 100 μm. It is also possible to employ a heat curable resin in place of the ultraviolet curable resin, but a resin is used which has a range of curing temperature in which it does not happen that the plastic substrate (PL (CF)) is deformed, or that the light transmittivity thereof deteriorates, due to the application of heat during the curing.

In Step 4 (FIG. 5D), a surface of a resin film (RF3) is coated with an adhesive (AD5), and a plastic substrate (0.1 mm thick; PL3) is attached thereto.

Finally, in Step 5 (FIG. 5E), a polarizing plate (PP1 or PP2) with an adhesive (AD6 or AD7) is attached to a surface of the plastic substrate (PL (CF) or PL3).

FIGS. 6A to 6E, being a fourth embodiment relating to a display panel manufacturing process, illustrate steps of fabricating a liquid crystal display panel, being a liquid crystal display cell having a liquid crystal layer between a thin film transistor layer (TFTL) remaining after a glass substrate has been removed partway through and a plastic substrate, in which another plastic substrate is attached to the thin film transistor layer.

In Step 1 (FIG. 6A), a color filter is formed on a 0.1 mm thick plastic substrate (PL (CF)), a thin film transistor layer (TFTL) is formed on a 0.5 mm thick glass substrate (GS) and, as well as both of them being attached to each other, a seal member SE is disposed between both substrates, and a liquid crystal LC is sealed inside, fabricating the liquid crystal display cell. The layer thickness of the liquid crystal LC between the substrate is around 4 μm.

In Step 2 (FIG. 6B), the glass substrate holding the TFT layer is removed by a mechanical polishing and/or an HF etching, or a transfer method.

In Step 3 (FIG. 6C), a surface of the TFT layer (TFTL) is coated with an ultraviolet curable resin by a spin coat method, a slit coat method, or the like, and furthermore, the resin film (RF4) applied as a coating is cured by being irradiated with ultraviolet (UV). Although the thickness of the resin film can be set arbitrarily, it is possible to set it to a range of 0.5 μm to 100 μm. It is also possible to employ a heat curable resin in place of the ultraviolet curable resin, but a resin is used which has a range of curing temperature in which it does not happen that the plastic substrate (PL (CF)) is deformed, or that the light transmittivity thereof deteriorates, due to the application of heat during the curing.

In Step 4 (FIG. 6D), a surface of the resin film (RF4) is coated with an adhesive (AD8), and a plastic substrate (0.1 mm thick; PL4) is attached thereto.

Finally, in Step 5 (FIG. 6E), a polarizing plate (PP1 or PP2) with an adhesive (AD9 or AD10) is attached to a surface of the plastic substrate (PL (CF) or PL4).

With the embodiment shown in FIGS. 6A to 6E, no glass substrate exists in the display panel itself, but in the event that the thin film transistor layer itself can maintain a layer form, instead of the glass substrate holding the thin film transistor as in the other embodiments, it is possible to improve the mechanical strength of the display panel, using the resin film, in the same way as with the other embodiments.

Next, a description will be given of an embodiment in which the invention is applied to the kind of organic electroluminescence display device (organic EL display device) shown in FIG. 7.

Figure 7:
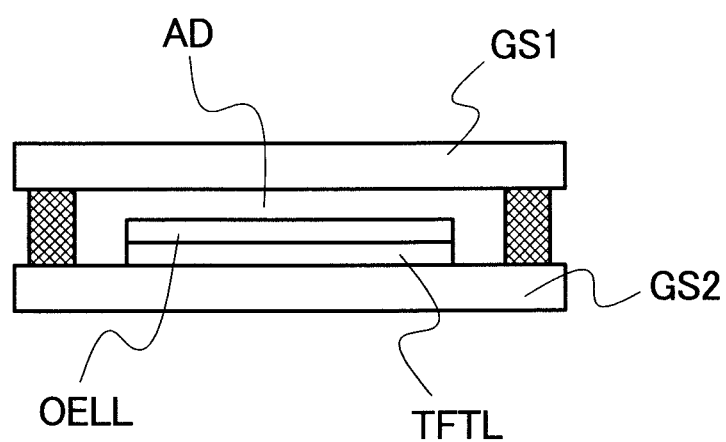
FIG. 7 is a sectional view illustrating a structure of an organic EL display panel used in the display device of the invention.

A display panel of the organic EL display device shown in FIG. 7 is such that a TFT layer (0.5 to 3 μm in layer thickness; TFTL) provided with a thin film transistor (TFT) circuit and the like, an organic EL layer (0.5 to 3 μm in layer thickness; OELL) forming a light emitting layer, and the like, are formed and disposed on a surface of a glass substrate (GS2). Then, a light emitting portion including the light emitting layer is hermetically sealed with a glass substrate (GS1), which is an opposed substrate, and a seal member SE. Also, a space between the two glass substrates (GS1 and GS2) is filled with an adhesive AD, more closely attaching both of them to each other.

In the organic EL display device, as shown in JP-A-2007-335365, there is a case in which a polarizing plate is attached to a display panel, and a description will be given, in a fifth embodiment relating to a display panel manufacturing process shown below, of the fact that the invention can also be applied to the display panel of this kind of organic EL display device.

Figure 8A:
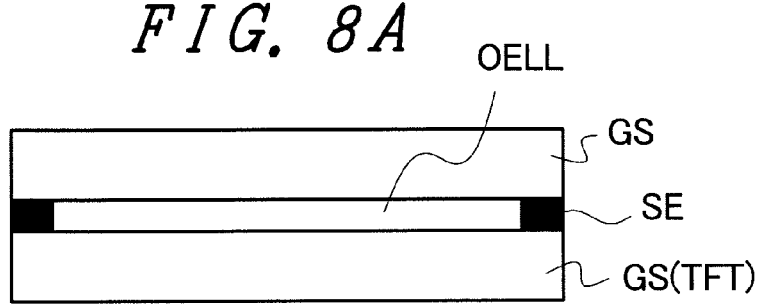
FIGS. 8A to 8D show a fifth embodiment illustrating a process of manufacturing a display panel used in the display device of the invention.

In Step 1 (FIG. 8A), an organic EL cell using glass substrates (each of which has a thickness of 0.5 mm) is fabricated by a heretofore known method. A thin film transistor, which carries out a drive control of the light emitting portion, a light emitting layer, and the like, are formed on the lower glass substrate (GS (TFT)). The thickness of the organic EL layer (OELL) formed between the two glass substrates is on the order of about 10 μm.

Figure 8B:
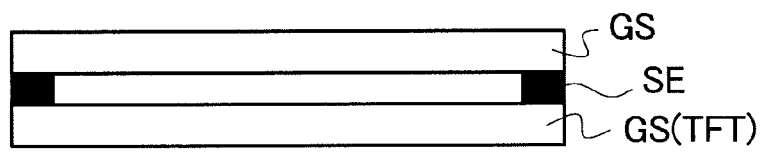

In Step 2 (FIG. 8B), the thickness of the two glass substrates is reduced to 0.15 mm by a mechanical polishing and/or an HF etching. It is also possible to reduce the thickness to, more preferably, 0.05 mm or less.

Figure 8C:
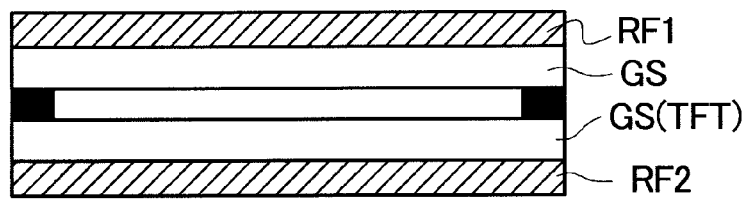

In Step 3 (FIG. 8C), a surface of each glass substrate is coated with an ultraviolet curable resin by a spin coat method, a slit coat method, or the like, and furthermore, the resin film (RF1, RF2) applied as a coating is cured by being irradiated with ultraviolet (UV). Although the thickness of the resin film can be set arbitrarily, it is possible to set it to a range of 0.5 μm to 100 μm. It is also possible to employ a heat curable resin in place of the ultraviolet curable resin, but a resin is used which has a range of curing temperature in which the application of heat during the curing does not cause thermal damage to the organic EL layer, and the like.

Figure 8D:
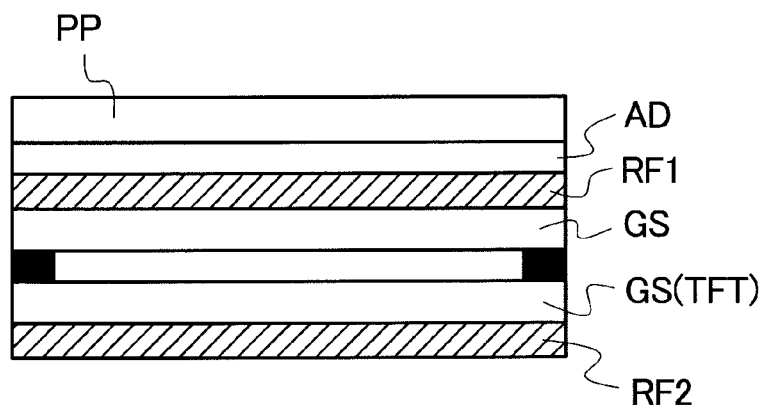

In Step 4 (FIG. 8D), a polarizing plate PP with an adhesive (AD) is attached to a surface of one resin film (RF1), thereby completing the display panel of the organic EL display device.

In an embodiment of FIGS. 8A to 8D too, since the mechanical strength of thin glass substrates is increased, resin films (RF1 and RF2) function effectively.

As heretofore described, according to the invention, it is possible to improve the mechanical strength of the display panel configuring the display device, and provide a display device with an increased impact strength.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising a plastic substrate and a thin film transistor layer including at least one thin film transistor,
    wherein the plastic substrate is a base substrate of the display device,
    wherein the thin film transistor layer is disposed on the plastic substrate via a resin film and an adhesive film without a glass substrate between the thin film transistor layer and the plastic substrate,
    wherein the resin film has a first surface formed on a first surface of the thin film transistor layer, the first surface of the thin film transistor layer being at one side of the plastic substrate,
    wherein the adhesive film is formed on a second surface of the resin film, the second surface of the resin film being at the one side of the plastic substrate, and
    wherein the resin film is attached to the plastic substrate by the adhesive film.

2. The display device according to claim 1, wherein of the resin film has a retardation of no greater than 5 nm.

3. The display device according to claim 1, wherein the resin film has a thickness of no greater than 100 μm.

4. The display device according to claim 1, wherein the resin film is an ultraviolet curable resin or a heat curable resin.

5. The display device according to claim 4, wherein the ultraviolet curable resin or the heat curable resin is applied as a coating, and thereafter, cured.

6. The display device according to claim 1, wherein the resin film is applied on the first surface of the thin film transistor layer.

7. The display device according to claim 1, wherein a polarizing plate is disposed at a main surface of the plastic substrate, the main surface is at a surface of the plastic substrate which is at an opposite side of the adhesive film.

8. The display device according to claim 1, further comprising another plastic substrate which faces the plastic substrate,
    wherein the another plastic substrate is disposed with respect to a second surface of the thin film transistor layer, the second surface being opposite to the first surface, and
    the another plastic substrate is attached to the plastic substrate.

9. The display device according to claim 8, wherein the thin film transistor layer is formed on a glass substrate, and is attached to the another plastic substrate,
    thereafter the glass substrate is removed from the thin film transistor layer, and
    thereafter the resin film is formed on the first surface of the thin film transistor layer,
    wherein the first surface of the thin film transistor layer is on the glass substrate when the thin film transistor layer is formed on the glass substrate.

10. The display device according to claim 8, wherein a polarizing plate is disposed at a main surface of the another plastic substrate, the main surface is at a surface of the another plastic substrate which is at an opposite side of the thin film transistor layer.

11. The display device according to claim 1, wherein a main material of the resin film does not have viscosity and adhesion.

* * * * *